United States Patent [19]
Nichols

[11] Patent Number: 5,423,479
[45] Date of Patent: Jun. 13, 1995

[54] THERMOELECTRIC ACTUATOR FOR TEMPERATURE CONTROL SYSTEMS

[75] Inventor: Galen E. Nichols, 1433 E. 100 North, Danville, Ind. 46122

[73] Assignee: Galen E. Nichols, Danville, Ind.

[21] Appl. No.: 153,795

[22] Filed: Nov. 17, 1993

Related U.S. Application Data

[63] Continuation of Ser. No. 38,508, Mar. 29, 1993, abandoned.

[51] Int. Cl.$^6$ ............................................. G05D 23/30
[52] U.S. Cl. ..................................... 236/49.3; 60/531; 236/68 B
[58] Field of Search ............... 236/49.3, 68 B; 60/531; 251/11

[56] References Cited

U.S. PATENT DOCUMENTS

| | | | |
|---|---|---|---|
| 2,989,281 | 6/1961 | Fritts | 251/11 |
| 3,157,801 | 11/1964 | Sheguen | 236/68 B |
| 3,196,685 | 7/1965 | Leigh et al. | 236/68 B |
| 3,778,021 | 12/1973 | Alexander et al. | 60/531 |
| 4,029,941 | 6/1977 | Huebscher et al. | 60/531 |
| 4,248,377 | 2/1981 | Jakobsen | 236/68 B |
| 4,258,899 | 3/1981 | Huelle et al. | 60/531 |
| 4,535,590 | 8/1985 | Jacobsen et al. | 60/531 |
| 5,014,520 | 5/1991 | Orner et al. | 236/68 B |

OTHER PUBLICATIONS

Johnson Controls Systems and Services Division, Milwaukee, Wisc. 53201-0423, Publication No. 2074.

Primary Examiner—William E. Tapolcai
Attorney, Agent, or Firm—Barnes, Kisselle, Raisch, Choate, Whittemore & Hulbert

[57] ABSTRACT

A temperature control system for a building or the like having a plurality of individually-controlled temperature zones wherein temperature variations from a set temperature generate actuating signals for valves, dampers or other regulating devices to vary temperatures in respective zones. The regulating devices are controlled by electrical-to-mechanical transducers which convert electrical actuating signals from a central controller to mechanical displacements at respective regulating devices. Each actuator has a piston assembly operated by working pressures which vary as a function of temperature in the zone being controlled. Pressure on the piston assembly is controlled from an expansion chamber containing an evaporatable-condensable refrigerant which is selectively heated and/or cooled by a semiconductor thermoelectric module. Operating as a heat pump, the thermoelectric module either evaporates or condenses the refrigerant in the expansion chamber in accordance with sensed temperature variations in the controlled zone to proportionally vary pressure in the expansion chamber.

13 Claims, 4 Drawing Sheets

THERMOELECTRIC ACTUATOR FOR TEMPERATURE CONTROL SYSTEMS

This is a continuation of application Ser. No. 08/038,508, filed on Mar. 29, 1993, now abandoned.

This invention relates to an apparatus for controlling the temperature in different zones of a building or the like and, more particularly, to a valve actuator for controlling fluid flow in such systems wherein the actuator is driven by a variable pressure source which includes a closed refrigerant system controlled by a semiconductor thermoelectric module.

BACKGROUND OF THE INVENTION

Heating, ventilation and air conditioning systems for large commercial and institutional buildings such as schools and large offices require elaborate temperature control systems. For many years, pneumatic control systems using pneumatic actuators were popular because they offered the advantages of low cost, ease of installation, maintainability and reliability. A typical pneumatic control system has a centrally-located air compressor. Compressed air is processed through a refrigerated air dryer, a series of filters, and finally a pressure reducing station to provide a system pressure of 15-25 PSI. This low pressure air, sometimes called main air, is distributed throughout the building via transmission lines to various low-pressure pneumatic controllers. The controllers will control the main air pressure through a branch line going to a controlled device or actuator for valves, damper motors and other regulating devices in a heating/cooling system. The controller responds proportionally to variations in a local environment temperature being controlled. Proportional control, as contrasted to intermittent, fully on or fully off, is preferred for commercial applications.

In general, the pneumatic actuator converts the branch line air into mechanical motion by pressurizing and depressurizing a rubber diaphragm or other type of piston assembly which in turn pushes against a piston shaft operatively connected to valves that control heating or cooling liquids or to dampers or damper motors for controlling air movement. As the diaphragm inflates, its size increases and it repositions the piston shaft. Conversely, as the diaphragm deflates, the piston shaft is returned to its original starting position by means of a return spring. Proportional pneumatic actuators provide accurate temperature control. Because they are reliable, low cost and relatively easy to install and maintain, they are still in wide use.

In recent years, computerized temperature controls have increased in popularity because, as compared to pneumatic systems, they offer greater flexibility and programmability for total environmental control of the building. The computer can network essentially every piece of information about the building at a central computer workstation where an operator can quickly diagnose, evaluate and set the temperature control throughout the building. Older pneumatic systems cannot effectively provide this capability. It would be cost-prohibitive and too mechanically complex to run large numbers of air transmission lines from every point of control in the building back to one centralized location. Early computerized systems used proportional electrical-hydraulic actuators at the valves and dampers where the actuator included an electric motor driving a hydraulic pump. Motor speed and, hence, pump output pressure are controlled from the computer.

Electrical-hydraulic actuators are much higher in cost than pneumatic actuators, making installation of a computerized system considerably higher than a pneumatically controlled system. Electrical-hydraulic actuators are relatively expensive not only due to higher initial cost, but also maintenance and replacement cost. The large number of moving parts, such as gears, springs, motors, clutches and limit switch assemblies, usually require hand assembly and are less durable. The motor, gears and clutches run in a housing filled with oil which can leak, often ruining ceiling tile and carpets. Electrical-hydraulic actuators are typically designed to operate in only one orientation, e.g., top side up. Because of their size, shape and limited orientation, electrical-hydraulic actuators may be difficult and expensive to install for some applications and special orientations. For example, two or three linkages and associated brackets might be required to obtain sufficient angular rotation and/or linear displacement at a valve in a manner such that the electrical-hydraulic actuator does not bind or stall. If the actuator is proportional, an elaborate balancing circuit is required along with a feedback circuit, requiring as many as eight to twelve wires per actuator.

Because of the cost disadvantages associated with electric-hydraulic actuators, hybrid systems have also been used where the system is centrally computerized and pneumatic field actuators are used to open and close valves and dampers. This is accomplished by interfacing the computer output to electrical-pneumatic pressure transducers for controlling the position of a pneumatic actuator. The hybrid system uses the same centrally located air compressor as a full pneumatic system and a pneumatic actuator similar to that in the full pneumatic system. The difference is that sensing and controlling is done through a computerized system using electronic signals transduced to corresponding pneumatic signals which in turn are used to actuate valves, damper actuators, and the like. However, electrical-pneumatic transducers are expensive as compared to prior art full pneumatic actuators, but not quite as expensive as electrical-hydraulic actuators. Hence this system is, at best, a compromise in cost and durability between the full pneumatic system and the computerized, electrical-hydraulic actuator systems.

By way of further background to the present invention, semiconductor thermoelectric devices utilizing the Peltier effect are also well-known for heat pump applications. Semiconductor elements, typically bismuth-telluride, can be heavily doped to create either an N-Type or P-Type and the junction therebetween will either produce heat or absorb heat, depending on the direction of, and at a rate proportional to, current passing through the junction. For practical heat pump applications, a number of semiconductor elements are combined in a module with opposite conductivity types connected electrically in series and thermally in parallel to increase heat-generating and heat-absorbing capacity. Thermoelectric modules are available commercially for refrigeration applications such as small refrigerators, water and beverage coolers, and direct temperature control in laboratory and scientific instruments. Thermoelectric modules are also commercially available for 12-volt source applications, for example, for use with an automotive battery or a 110-volt AC to 12-volt DC converter. They operate economically, are compact and lightweight yet rugged and durable, and have no moving parts. For purposes of the present invention, as will later be apparent, thermoelectric modules operated as a heat pump can selectively heat or cool one junction, depending on the direction of current flow.

SUMMARY OF THE INVENTION

Among the objects of the present invention are to provide temperature control systems that, as compared to prior art temperature control systems, effectively and economically utilize advantages of prior art computerized systems while retaining advantages of prior art pneumatic actuators; that do not require a central air compressor system; that are relatively low in both initial cost and maintenance cost; that effectively utilize an improved actuator for valves, dampers and the like wherein the actuator can interface directly with a computerized central control and with control valves, dampers and the like; that achieves proportional control and can respond rapidly; that is relatively low cost, of simple construction, has few moving parts, is reliable and durable and hence requires low maintenance; and that is compact and lightweight and provides mounting versatility.

A further object of the present invention is to provide an electrical-to-mechanical transducer that is not only effective for temperature control systems but is potentially useful for numerous other applications and provides a mechanical output proportional to an electrical input, is relatively low-cost, low-maintenance, reliable, durable, compact, lightweight, of relatively simple construction with few moving parts, and versatile in operation and in mounting.

These benefits and advantages are achieved by actuating a piston assembly from a variable pressure source comprising a closed, hermetically sealed, variable pressure system of the evaporatable-condensable refrigerant type. Vapor pressure acting on the piston, either directly or indirectly through an incompressible hydraulic fluid, is regulated by selectively heating or cooling the refrigerant with a semiconductor thermoelectric module. In the preferred embodiment, the thermoelectric module, closed refrigerant system and piston assembly are unitary actuator assemblies, each operating valves, dampers and the like in multi-zone temperature control system. A central computerized controller provides electrical control signals to each actuator which in turn opens and closes valves or other regulating devices proportionally to variations in control signals.

Other objects, features and advantages will be apparent from the accompanying drawings and the following detailed description.

DESCRIPTION OF THE INVENTION

Figure 1:
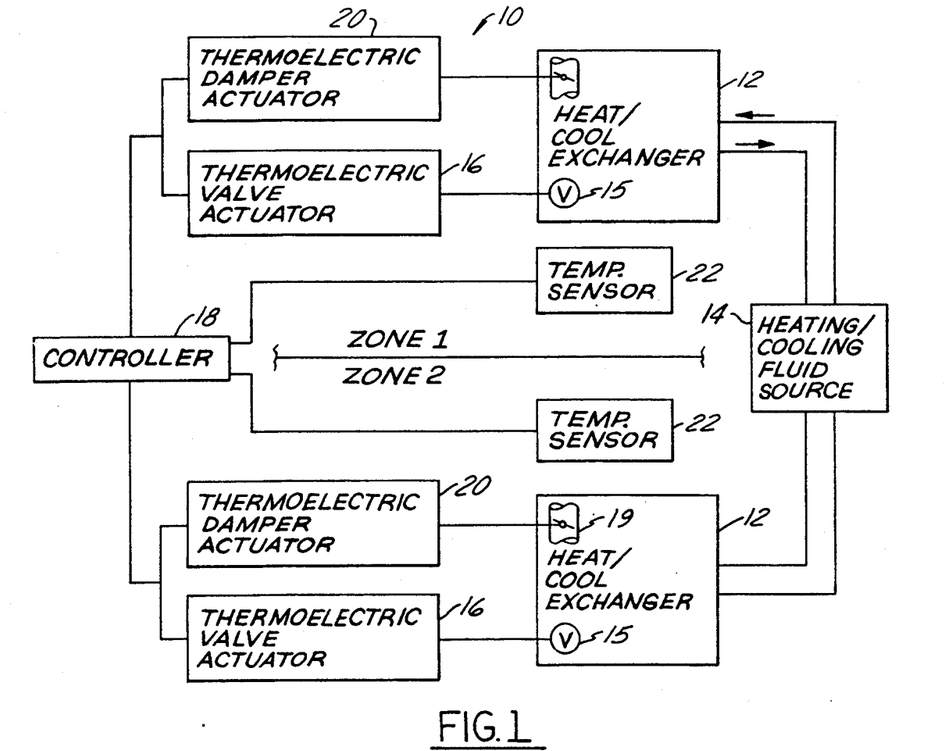
FIG. 1 is a block diagram schematically illustrating a multiple zone heating-cooling system and associated computer control utilizing thermoelectric valve actuators of the present invention.

Referring in greater detail to the drawings, FIG. 1 illustrates in block form a heating and cooling system 10 for multiple zones, shown for simplicity as two zones, "Zone No. 1" and "Zone No. 2". It will be appreciated that for typical commercial and institutional buildings there would be a large number of individually controlled temperature zones. For purposes of understanding the present invention, like elements in each of Zones 1 and 2 are indicated by the like reference number.

Each zone includes a heat/cool exchanger 12 through which either heating or cooling fluid is circulated from a source 14, i.e., hot water for heating and chilled water for cooling. Fluid flow is controlled by a valve 15 operated automatically by a thermoelectric actuator 16 of the present invention in response to electrical actuating signals from a computerized controller 18. Air flow through exchanger 12 may also be regulated by a suitable damper 19, or a damper motor, operated by a thermoelectric actuator 20 in response to electrical actuating signals from controller 18. In the preferred embodiment, the actuating signal from controller 18 is a low-voltage signal that can vary between plus and minus 12 volts DC. Such low voltage outputs can be developed from commercially-available operational amplifiers and easily wired with low-voltage wiring directly to actuators 16, 20 for direct powering of the actuators. This is particularly advantageous for applications having a large number of temperature controlled zones and consequently a large number of damper and valve actuators 20, 16 dispersed at remote locations. Each zone is provided with a temperature sensor 22 to supply an analog control signal to controller 18 that varies in accordance with ambient temperature variations within the zone. In response to temperature deviations from a preselected "set" temperature, controller 18 provides a proportional actuating signal which actuates valve actuator 16 proportionally to regulate the fluid flow through heat exchanger 12 . Air flow through heat exchanger 12 may be similarly regulated by controller 18 proportionally to zone temperature deviations via actuator 20.

For purposes of the present invention, thermoelectric actuators 16, 20 are of similar construction and operation and hence will be understood by reference to the construction and operation of actuator 16 (FIGS. 2-5). Actuator 16 has an output shaft 26 whose axial position is controlled by a piston assembly 28 mounted in a working chamber 30 of a cylindrical hermetically-sealed metal housing 32. Working pressure in chamber 30 is provided via a hollow tube 34 from an hermetically-sealed evaporator/condenser expansion chamber 36 within a housing 38 which is charged with a refrigerant fluid 40. Fluid 40 is illustrated partly as a liquid 39 in the lower portion of chamber 36 and partly as vapor 41 in the upper portion of chamber 36. Fluid 40 is heated and/or cooled by a pair of semi-conductor thermoelectric modules 42 mounted at opposite sides of housing 38, with each module having a finned heat sink 44 associated therewith. Modules 42 are electrically connected via leads 46 to controller 18.

In response to an actuating signal from controller 18, modules 42 heat (or cool) fluid 40 to proportionally vary the vapor pressure in expansion chamber 36 which in turn proportionally varies the pressure in working chamber 30 acting on piston assembly 28 to displace shaft 26 proportionally to the signal level at leads 46. Shaft 26 is connected directly, or through suitable mechanical linkage, to valve 15 in the heat-cool exchanger 12 (FIG. 1) to control the temperature in zone 1 or zone 2, as the case may be.

It will be understood that the term "refrigerant" is used in a broad sense to describe fluid 40 and not to imply that fluid 40 is intended to refrigerate the closed variable pressure system formed by chamber 36, tube 34 and chamber 30. Fluid 40 can be any suitable evaporatable-condensable fluid changeable from its liquid phase to its vapor phase and vice-versa, depending on the operating temperatures and pressures in the closed system. In the preferred embodiment to date, fluid 40 is trichloromonofluoromethane. However, other evaporatable-condensable fluid could be selected depending on design considerations such as operating parameters and environmental factors.

Figure 2:
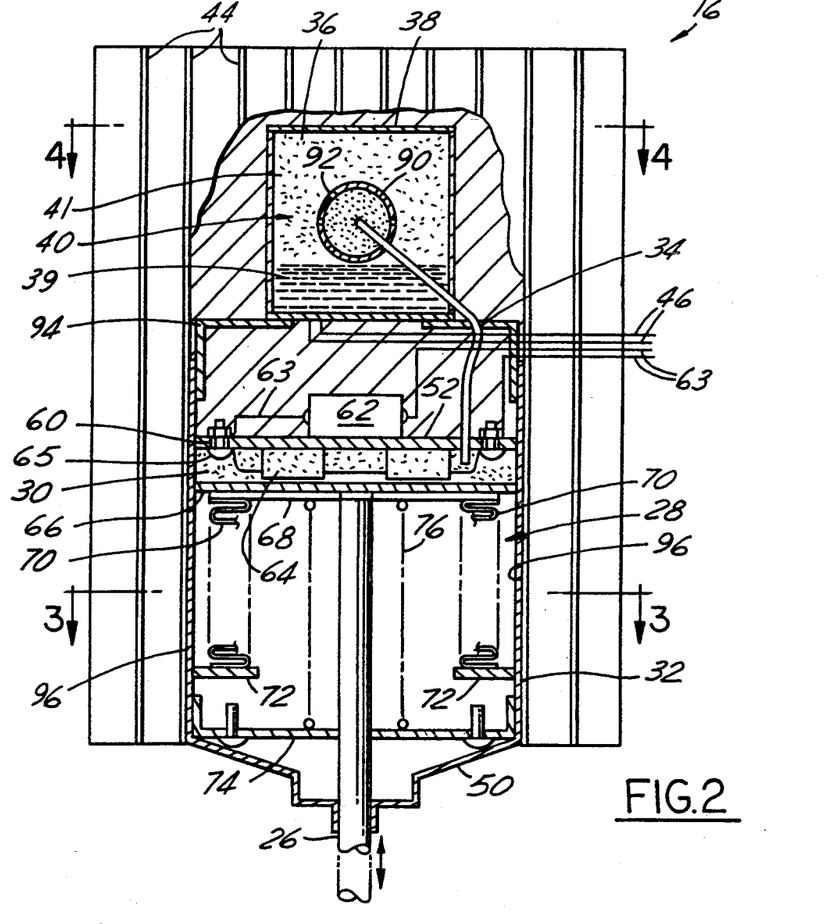
FIG. 2 is an elevational view, partly broken away and in section, of one embodiment of the thermoelectric actuator of the present invention.
Figure 3:
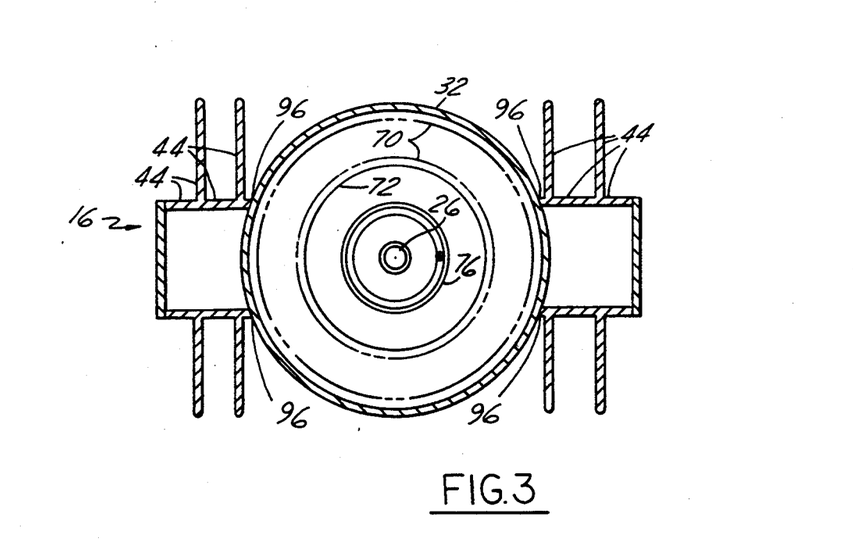
FIG. 3 is a horizontal section of the actuator taken on line 3—3 of FIG. 2.
Figure 4:
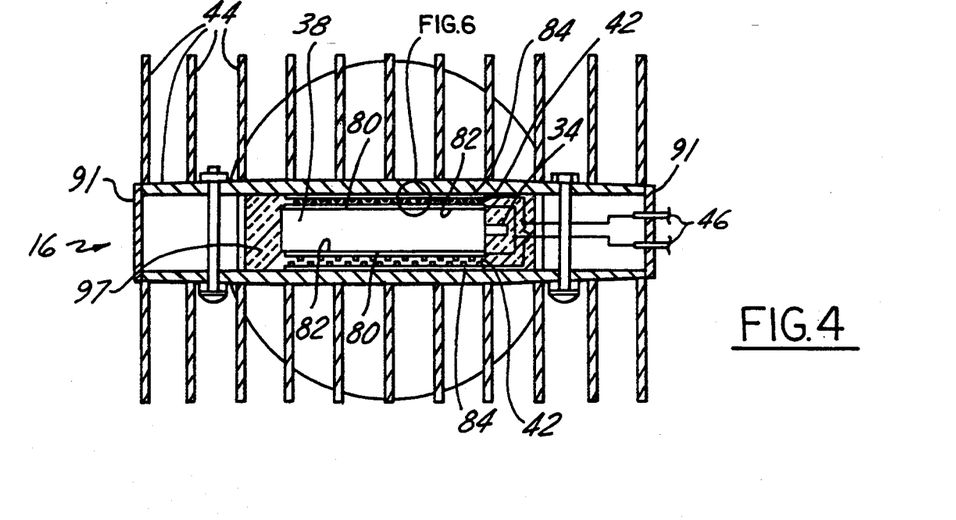
FIG. 4 is a horizontal section taken on line 4—4 of FIG. 2.
Figure 5:
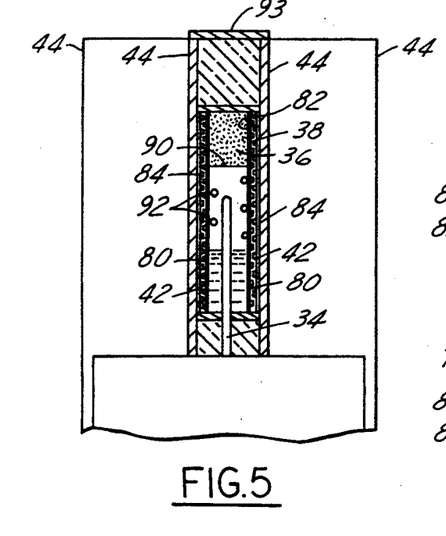
FIG. 5 is a side view of the actuator of FIGS. 2-4 taken from the right of FIG. 2 and partly broken away and in section.
Figure 6:
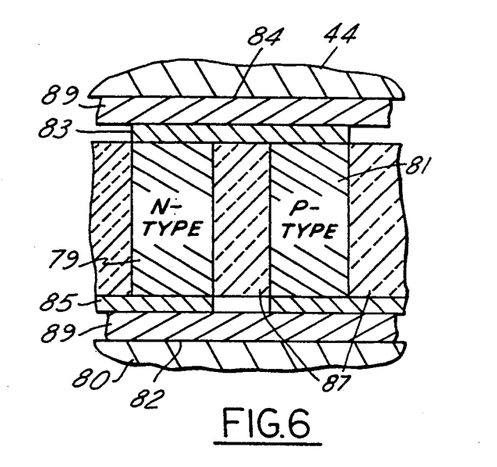
FIG. 6 is an enlarged fragmentary view taken from FIG. 4 and illustrating the internal arrangement of a semiconductor thermoelectric module.

More particularly, housing 32 is closed at its lower end by an apertured end cap 50 and at its upper end by a sealed plate 52 which is circumferentially sealed as by welding or soldering. A pair of resistance heaters 64 disposed in chamber 30 are connected via leads 63 and connector screws 65 in series circuit with a thermostat 62 mounted on plate 52. Heaters 64 are energized through normally closed thermostat 62 from a 12-volt DC source (not shown). Heaters 64 insure that chamber 30 is the warmest part of the closed pressure system to maintain fluid 40 in its vapor phase in chamber 30 and thus insure that fluid 40 condenses only in expansion chamber 36. Thermostat 62 is for overload protection to disconnect heaters 64 at high temperatures in chamber 30, say 160° F. Heaters 64 only incidentally affect the vapor pressure in chamber 30. Connector screws 65 are mounted on plate 52 using electrical insulating bushings 60 which also seal plate 52 so that chamber 30 remains sealed.

Piston assembly 28 comprises a face plate 66, a top plate 68, and a metallic spring bellows 70 whose lower end is stationarily mounted on a radial flange 72 on housing 32. The bottom convolution of bellows 70 is sealed circumferentially with flange 72 and the top convolution of bellows 70 is sealed with plate 68 so that vapor pressure in chamber 30 is not lost to the interior of bellows 70. Output shaft 26 has its upper end mounted on plate 68 and extends downwardly through a bulkhead 74 and out of housing 32 through end cap 50. A return spring 76 is mounted between bulkhead 74 and plate 68 to bias piston assembly 28 toward its retracted position, the upward position is viewed in FIG. 2. Suitable field-adjustable stops (not shown) may be provided to set the upper and lower travel limits of piston assembly 28 and hence the travel limits of output shaft 26. Bellows 70 is a metallic spring material such as phosphor brass and has its spring characteristic selected along with the characteristics of return spring 76 to provide the desired relationship between vapor pressure in chamber 30 and the position of output shaft 26. Although return spring 76 is illustrated as a separate spring in actuator 16, for some applications the return spring function, as well as travel limit functions, are built into the regulating device actuated by shaft 26, e.g., a valve, damper or the like.

Although a particular arrangement has been described for piston assembly 28, it will be apparent that a wide variety of metallic bellows and other types of pressure-to-mechanical transducers could be used, depending on the application. Indeed, the arrangement of working chamber 30 and piston assembly 28 is similar in many respects to prior art proportional pneumatic actuators used in heating and cooling systems for variable pressure supplied from a different type of source, for example either an external or a self-contained compressor.

In the embodiment illustrated in FIGS. 2–6, housing 38 has a flat, rectangular box shape with each side wall 80 mounted in physical and thermal contact with one junction face 82 of a respective thermoelectric module 42 whose opposite junction faces 84 are mounted in physical and thermal contact with a respective heat sink 44. Thermoelectric modules 42 are, per se, of conventional construction and readily available commercially from various manufacturers such as Melcor, Materials Electronic Products Corporation, Trenton, N.J. As previously described, a number of semiconductor elements are combined in module 42 with opposite conductivity types connected electrically in series and thermally in parallel to increase heat-generating and heat-absorbing capacity. Typically the semiconductor elements are bismuth-telluride arranged in a flat package, a segment of which is illustrated schematically in FIG. 6 as including N-type elements 79 connected at one junction to P-type elements 81 by conducting straps 83 and at the opposite junction by conducting straps 85, with insulation 87 separating opposite conductivity type segments and with cover layers 89 of electrical insulating but thermally-conductive material.

A ring-shaped baffle 90 is mounted in chamber 36 between side walls 80 and has circumferentially spaced openings 92 establishing fluid communication between chamber 36 and tube 34 while minimizing the likelihood of liquid refrigerant 39 entering tube 34. Baffle 90, together with tube 34, provides effective operation of actuator 16 for different mounting orientations, for example, even upside-down from the position shown in FIG. 2. The operating parameters are selected so that when chamber 30 is charged, liquid refrigerant 39 will not reach a level inside baffle 90. Housing 38 is mounted on housing 32 by brackets 94 and thermally isolated from heat sinks 44, plate 52, and housing 32 by insulation 97. Also in the embodiment illustrated in FIGS. 2–5, heat sinks 44 conveniently form side walls of an exterior housing closed by end panels 91 and top panel 93. The lower portion of heat sinks 44 are cut away with rectangular openings 96 to accommodate housing 32 which is fastened to heat sinks 44 to form a unitary assembly. Although a specific arrangement of thermoelectric modules 42, chamber 36, fluid 40, tube 34, chamber 30 and piston assembly 28 has been shown for purposes of illustration, various modifications within the scope of this invention will be apparent.

By way of further illustration, assuming that the heating and cooling system 10 is operating in the heating mode, the system parameters can be set up so that for a desired "set" zone temperature, for example 72° F. and a "normally closed" configuration of valve 15, for example, the vapor pressure in chamber 30, an appropriate actuating signal from controller 18 will partially open valve 15 to circulate heating fluid through heat exchanger 12 at a rate to maintain 72°. The desired set temperature for zone 1, for example, may be set at the controller and in response to a temperature signal from sensor 22, controller 18 in turn develops a DC actuating signal whose polarity and amplitude vary proportionally with variations in actual room temperature as compared to the set temperature. For an actual room temperature, sometimes called the control point, below the set temperature, the actuating signal from controller 18 is applied to leads 46 at a polarity such that thermoelectric modules 42 heat fluid 40 and cool heat sinks 44. As the fluid 40 is heated, more and more liquid turns to vapor, in effect expanding fluid 40 and increasing the vapor pressure which is transmitted via tube 34 into chamber 30 to move the piston assembly 28 downwardly, as viewed in FIG. 2. The higher the voltage of the input signal at leads 46, the larger the phase change, producing a higher vapor pressure acting on piston assembly 28 to further extend shaft 26 and further open valve 15.

When the room temperature goes above the preset room temperature, the polarity of the signal at leads 46 reverses, so that, modules 42 cool refrigerant fluid 40. This causes more fluid to condense as liquid 39 in chamber 36 which in turn decreases the vapor pressure in chamber 30. As the pressure in chamber 30 drops, return spring 76 overcomes the lower pressure to return shaft 26 toward its retracted position and valve 15 toward its fully closed position. Except when thermostat 62 opens, heaters 64 at all times receive a steady state level DC bias current to insure that the temperature in chamber 30 is above that temperature at which fluid will condense in chamber 30 and that fluid condenses to its liquid phase only in chamber 36.

A proportional relationship between the voltage of the input signal at leads 46 and the position of shaft 26 occurs, at least in part, because the boiling point of the refrigerant fluid 40 is a function of the vapor pressure at the liquid gas interface. Stated differently, a given refrigerant fluid 40 will always generate given vapor pressures at given fluid temperatures. For a given voltage variation at leads 46, the system will equalize at a pressure which causes a corresponding proportional variation in the position of output shaft 26. Consequently, increases and decreases in the voltage of the signal at leads 46 will cause corresponding shifts in the position of output shaft 26 to proportionally open or close valve 15.

Most importantly, thermoelectric modules can heat fluid 40 at one polarity input to terminals 46 and cool fluid 40 at the opposite input polarity. Consequently, the present invention will respond rapidly to room temperature variations in either direction while providing for wide adjustment of the set points for different desired temperatures under wide variations in ambient conditions. Once the desired set point is reached, the valve will be opened or closed proportionally to room temperature variations to maintain the desired set point temperature without excessive overshoot and without operating the valve intermittently between fully on and fully off positions. Although perhaps ideally the displacement at shaft 26 would preferably be linearly proportional to room temperature variations, as a practical matter linear proportionality is difficult to achieve and is not required for heating and/or cooling system applications. For other more sophisticated applications, it might be practical to achieve true linear proportionality by more precisely matching input voltage increments to shaft displacement increments for given operating conditions.

By way of example and not of limitation, in one embodiment of a heating and cooling system operated according to the present invention, chamber 36 was forty-five millimeters square and twelve millimeters deep, with a volume of twenty-four cubic centimeters. The working chamber 30 had a minimum volume of ninety cubic centimeters with the piston fully retracted. This closed refrigeration system was charged with seven cubic centimeters of trichloromonofluoromethane to provide an initial working pressure of about 0.037 p.s.i.g. at 75° F. ambient. Bellows 70 was phosphor brass and had an outside diameter of 3 inches, an inside diameter of 2.16 inches and a working face of 5.13 square inches. This particular bellows is returned to its normal retracted position with the return spring 76 rated at two pounds expanded and seven pounds compressed. Thermoelectric modules 42 were rated at fifty-one watts each. By way of further illustration, for this particular arrangement, pressure in the chamber 30 varied with actuating voltage in the manner generally shown by plot 98 in FIG. 8 at about 60° F. ambient. Although plot 98 is shown as linear for purposes of illustration, in practice it would typically be nonlinear and still provide effective proportional control for commercial heating and cooling applications. The total stroke of output shaft 26 was about three-quarters of an inch and at 40 p.s.i.g. (fifteen volts input) in chamber 30 the actuator developed about 205 lbs. force at shaft 26.

It will be understood that this example is for purposes of illustration only. For particular applications the characteristics of the working chamber 30 and piston assembly 28 can be selected following prior art criteria for proportional pneumatic actuators. Typically, prior art proportional pneumatic actuators are rated according to a nominal spring range having a starting point that is field adjustable within nominal limits.

Although the present invention provides versatility for different applications, it will be understood that one of the important advantages of the present invention is that it can be initially set up to provide for proportional valve actuation in a manner similar to prior art proportional pneumatic actuators but driven directly by a low voltage output from a differential amplifier in controller 18. As with prior art proportional pneumatic actuators, the system can be set up to operate over a temperature window, sometimes referred to as the throttling range, except that the controller output provides a proportional control voltage rather than a proportional control pressure. For example, referring to FIG. 7 a typical throttling range might be four degrees (plus and minus two degrees variation of the control point or zone temperature about a desired set point temperature). Consequently, for any desired set point temperature, the controller output can change over a minus twelve volt to plus twelve volt range according to deviation of the control point temperature from the set point temperature. If the control point (zone) temperature varies more than plus or minus 2° F. from the desired set point, the signal will be either a full plus or minus 12 volts to fully open or close the valve. This condition will continue until the control point temperature returns to within the 4° F. throttling range. The signal will then begin decreasing toward a more steady state voltage as the control point temperature approaches the set point temperature to maintain the valve at the position required to maintain the control point at the set point. Of course generally steady state voltages and valve positions are a function of the set point temperature and the load conditions of the heating or cooling system in the manner analagous to prior art proportional pneumatic systems. Most importantly the valve is not operated intermittently between either fully on or fully off positions.

To illustrate further, for a heating mode assume that the set point temperature has been programmed to 72° F. and that this coincides with a stable valve position of, say, 50% open. As the control point temperature varies in the throttling range between 70° and 74°, the signal can vary proportionally between plus 12 and minus 12 volts and the valve position can modulate between fully open and fully closed to maintain the control point temperature at 72° F. If the control point temperature drops to 68° F. (say a window were left open), a maximum signal of 12 volts will fully open the valve to provide maximum heating until the control point reaches 70° F. The signal will then begin decreasing proportionally to approach a more steady state voltage as the control point temperature approaches 72° F.

Numerous other variations for heating and cooling applications might also be practical in certain situations. For example, the variable pressure source (chamber 36, fluid 40 and thermoelectric modules 42) can be packaged separately from the working chamber and piston assembly (chamber 30 and piston assembly 28) to overcome particularly difficult mounting situations. A single expansion chamber (36, FIGS. 2–5; 118, FIGS. 9–12) with its thermoelectric module (42, FIGS. 2–5; 130, FIGS. 9–12) could be used to drive more than one piston assembly 28 and output shaft 26 in sequence by selecting return springs 76 having different ratings, for example, 3 to 6 lbs. for one spring and 10 to 13 lbs. for the other spring. With proper selection of the valves and piston assemblies, a single variable pressure source could also be used to actuate two piston assemblies, one for a valve controlling hot water circulation and the other for controlling chilled water circulation. However, the present invention is especially suited for integrating the thermoelectric module, closed refrigerant system and piston assembly into a single thermoelectric actuator unit and this arrangement would be preferred for most applications.

Figures 7, 8, 9:
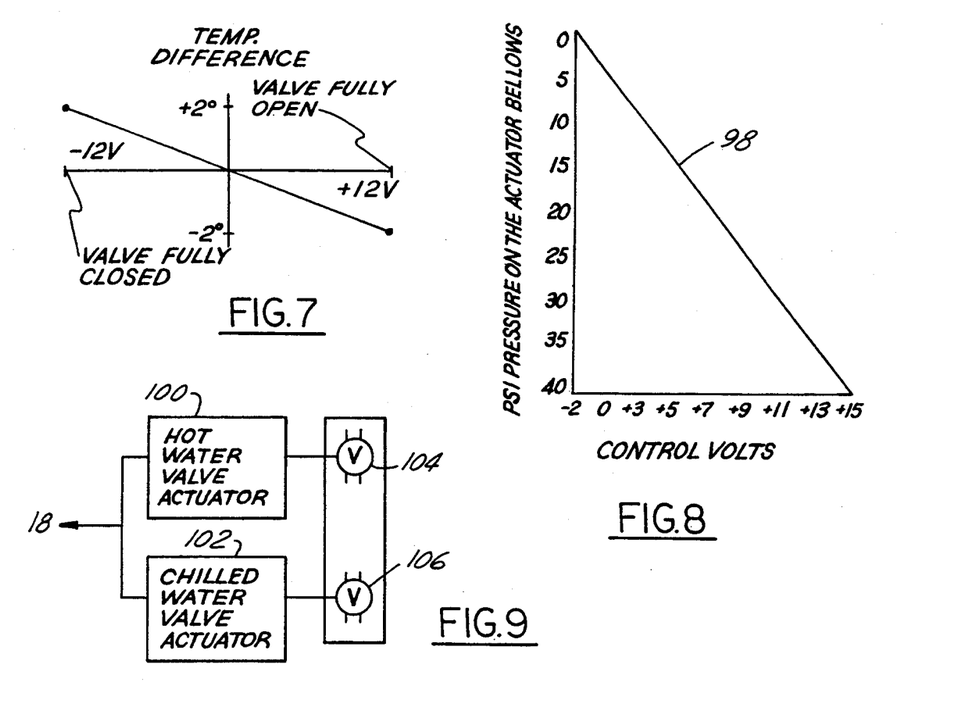
FIG. 7 is a plot of voltage applied to a thermoelectric module versus temperature difference.
FIG. 8 is a plot of vapor pressure versus voltage applied to the thermoelectric module.
FIG. 9 illustrates a further embodiment for correlated actuation of both heating and cooling valves.

FIG. 9 schematically illustrates one such modification of the present invention wherein the output from the differential amplifier in controller 18 is fed to both a hot water valve actuator 100 and a chilled water valve actuator 102 which operate valves 104, 106 respectively. By properly selecting the polarity of the signal applied to actuators 100, 102 and normal configuration of the valves 104, 106 (normally open or normally closed) and by providing a dead band in the output from controller 18, valves 104, 106 can be operated in a push-pull manner, e.g., at low zone temperatures, valve 104 is fully open and valve 106 is fully closed and at high zone temperatures, valve 104 is fully closed and valve 106 is fully open.

Although the thermoelectric actuator 16 illustrated in FIGS. 2–6 has been operated successfully, FIGS. 10–13 show a thermoelectric actuator 110 representing a further embodiment of the present invention which would be preferred for many practical commercial applications. Since actuator 110 is similar in many respects to actuator 16 (FIGS. 2–6), like reference numerals will be used to designate like components.

Actuator 110 comprises a cylindrical exterior case 112 having a piston assembly 28 mounted in the lower portion of case 112 by means of an annular flange 72. Piston assembly 28 (FIGS. 10–13) like piston assembly 28 (FIGS. 2–5) includes a metallic bellows 70 mounted on flange 72. Top plate 68 is mounted on the top of bellows 70 with output shaft 26 being mounted on plate 68 and extending downwardly through bottom cover 50. Return spring 76 is mounted between top plate 68 and bulkhead 74. Working chamber 30 is formed in the lower portion of case 112 by a metal plate 114 which is sealed circumferentially in case 112. Chamber 30 is connected via a hollow tube 116 to a sealed expansion chamber 118 formed by a housing 120 mounted in the upper portion of case 112. One end 138 of tube 116 passes through and is sealed in plate 114 and opens into chamber 30. The other end 139 of tube 116 opens at the center of expansion chamber 118. Chamber 118 is charged with a refrigerant fluid 122 shown in FIG. 10 as being in its liquid phase at the bottom of chamber 118. The balance of expansion chamber 118, along with tube 116 and working chamber 30, is filled with an hydraulic liquid 124 which is incompressible and remains in its liquid phase throughout the operation of actuator 110. Fluid 122 is heated and cooled by a thermoelectric module 130 having one junction face 132 in physical and thermal contact with a bottom wall 134 of housing 120 and an opposite polarity junction face 136 in physical and thermal contact with plate 114. Thermoelectric module 130 is connected via leads 46 to a controller such as controller 18 in FIG. 1 to receive actuating signals that can vary between plus and minus 12 volts DC. Insulation 142 thermally isolates housing 120 from case 112 and plate 114 so that the temperature of fluid 122 can be closely controlled.

Figure 10:
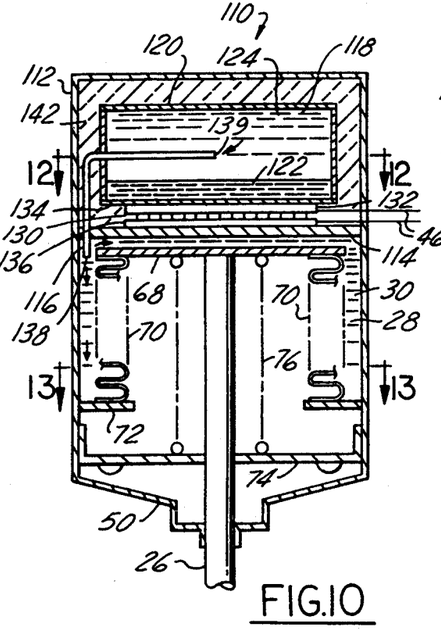
FIG. 10 is a vertical sectional view of another embodiment of the thermoelectric actuator of the present invention preferred for most commercial installations.
Figure 11:
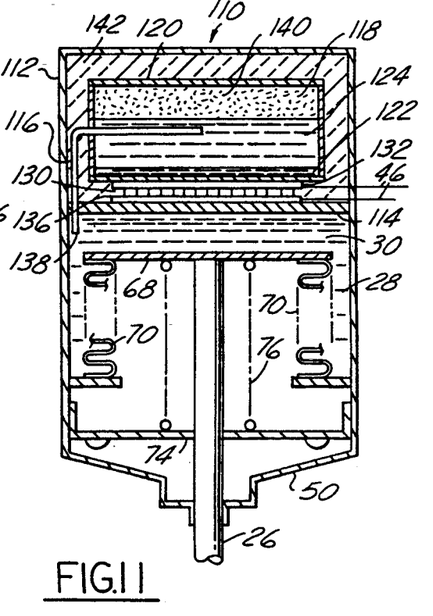
FIG. 11 shows the preferred embodiment of FIG. 10 with a piston assembly shown in its shifted position.
Figure 12:
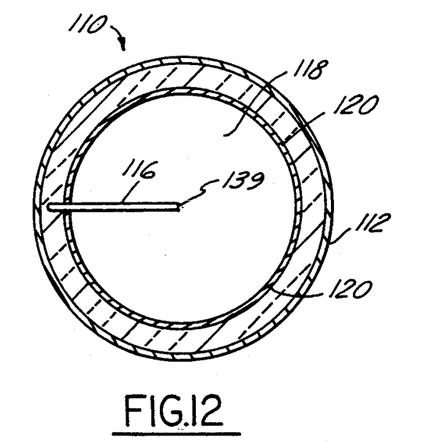
FIG. 12 is a horizontal section taken on line 12—12 of FIG. 10.
Figure 13:
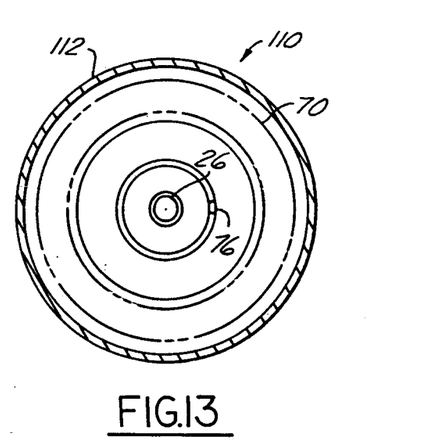
FIG. 13 is a horizontal section taken on line 13—13 of FIG. 10.

Operation of actuator 110 (FIGS. 10–13) is substantially the same as actuator 16 (FIGS. 2–6) except that vapor pressure variations in expansion chamber 118, caused by either heating and/or cooling refrigerant fluid 122, are transmitted to working chamber 30 via hydraulic liquid 124. Assuming for purposes of illustration that operating conditions are set up so that refrigerant 122 is in its substantially liquid state when shaft 26 is retracted, in response to an actuating signal at leads 46 with a polarity that heats junction 132, as fluid 122 vaporizes and expands, heated vapor 140 will collect at the top of chamber 118 (FIG. 11) and increase the vapor pressure in expansion chamber 118. The pressure increase in the closed system compresses bellows 70 and shifts output shaft 26 downwardly, as shown in FIG. 10. As bellows 70 compresses, some hydraulic liquid 124 is transferred from chamber 118 to chamber 30. From the earlier description of actuator 16 (FIGS. 2–6), it will be apparent that variations in the actuating signal at leads 46 from controller 18 cause proportional displacement of output shaft 26. As with the embodiment of actuator 16 in FIGS. 2–6, proportional control results because a given refrigerant will develop given vapor pressures at given temperatures. The temperature of refrigerant fluid 122 can be closely and rapidly controlled because module 130 either heats or cools chamber 118, depending on the amplitude and polarity of the input signal at leads 46.

Although the overall operation of actuator 110 (FIGS. 10–13) is generally the same as that of actuator 16 (FIGS. 2–6), actuator 110 has several advantages. In the preferred embodiment, exterior case 112, expansion chamber housing 120 and plate 114 are made of high thermal conductivity materials such as copper or copper alloys. When junction face 132 of thermoelectric module 130 heats fluid 122 and liquid 124, some BTUS added to hydraulic liquid 124 via junction face 132 are transferred to and absorbed at the opposite junction face 136 to enhance the operating efficiency of the system. Similarly, some BTUS added at junction 136 when fluid 122 is cooled, are transferred to and absorbed at junction face 132. Stated differently, any heat transfer via liquid 124 and plate 114 is in a direction to aid the heat pumped by module 130. The net effect is that, as compared to the embodiment of FIGS. 2–5, less heat need be either dissipated or absorbed, as the case may be, through the exterior case 112. If required, exterior finned heat sinks could be mounted on case 112.

The compact component arrangement in actuator 110 allows chamber 118 to be thermally insulated from housing 112 so that temperatures in chamber 118 can be closely and precisely controlled by module 130 without heat loss from or heat absorption by other components. As with actuator 16 (FIGS. 2–6), according to one important aspect of the present invention, because the thermoelectric modules can both heat and cool, the temperature of fluid 122 can not only be closely controlled but the temperature can be changed rapidly to provide a fast response time for temperature variations in the environment being controlled. The response time does not depend solely on heat being thermally conducted directly from fluid 122 to the ambient environment through heat sinks 44 (FIGS. 2–5) or case 112 (FIGS. 10–13).

Because tube 116 opens at the center of chamber 118, by properly selecting types and amounts of refrigerant fluid 122 and hydraulic liquid 124 in the system, the geometry insures that refrigerant fluid 122, either in liquid or vapor form, will not enter tube 116 and be transferred to working chamber 30, regardless of the orientation of actuator 110. The amount of hydraulic liquid in expansion chamber 118 and working chamber 30 is selected so that when output shaft 26 is fully extended (i.e., bellows 70 is fully compressed), tube end 139 is immersed in hydraulic liquid 124 regardless of the orientation of actuator 110. Consequently, actuator 110 can be turned upside-down or turned on its side from the orientation shown in FIGS. 10 and 11 when installed and still operate without transferring refrigerant 122 to chamber 30.

In one embodiment of actuator 110, refrigerant fluid 122 was trichloromonofluoromethane and hydraulic liquid 124 was denatured alcohol. Since trichloromonofluoromethane is heavier in its liquid phase than alcohol, the trichloromonofluoromethane in its liquid phase will remain at the bottom of chamber 118, and in its vapor phase will boil to the top of chamber 118, through but without absorption into the alcohol, regardless of the orientation of the actuator 110. Although this selection of trichloromonofluoromethane as the refrigerant fluid 122 and alcohol as the liquid 124 is preferred based on initial development work, it is anticipated that other liquids could be used, and indeed later become preferred, for hydraulic liquid 124 and that other combinations of refrigerant fluid and hydraulic liquid can be used. Depending on the operating parameters for a given application, if it is anticipated that refrigerant 122 might be transferred to and condensed in working chamber 30, heaters could be added to working chamber 30 along the lines of heaters 64 in FIG. 2.

From the foregoing it will be apparent that a temperature control system incorporating a thermoelectric actuator of the present invention with a self-contained variable pressure source driven by a thermoelectric module provides effective proportional control of valves, dampers and the like, and is versatile, reliable, durable, and cost-efficient. Although the thermoelectric actuator constructed according to the present invention was developed specifically for heating and cooling systems and is particularly well suited for such applications, it will be apparent that the thermoelectric actuator alone has potentially broader applications requiring an electrical-to-mechanical transducer. It will also be understood that the present invention has been described hereinabove for the purposes of illustration and not to indicate the limits of the present invention, the scope of which is defined by the following claims.

I claim:

1. A control system for a building and the like having a plurality of individual zones in which environmental conditions are individually controlled, comprising:
   a remote central controller,
   respective means for sensing actual environmental conditions in respective zones to provide control signals which vary as functions of actual environmental conditions in respective zones, said remote central controller being responsive to said control signals to provide respective low-voltage, electrical actuating signals which vary in amplitude and polarity as functions of respective control signals,
   source means for providing an environmental condition varying medium to respective zones,
   respective regulator means in each zone for controlling said medium in its respective zone and
   respective actuating means responsive-to actuating signals to operate respective regulator means in accordance with condition variations in its said respective zone,
   said actuating means comprising:
      means providing an expansion chamber,
      an evaporatable-condensable working fluid in said expansion chamber and changeable from a liquid state to a vapor state and vice versa in accordance with temperature to provide a source of variable vapor pressure,
      means providing a working chamber,
      piston means movable in said working chamber in response to said variable vapor pressure,
      output means operatively connected between said piston means and its said respective regulating means to operate its said respective regulator means in accordance with movement of said piston means,
      thermoelectric means for controlling said temperature of said working fluid in said expansion chamber in accordance with its said actuating signal to move said piston means and thereby control its said respective regulating means in accordance with variations in said actual environmental conditions, said thermoelectric means exhibiting a Peltier effect and being operable in a first heat pump mode at one polarity of its respective actuating signal to heat said working fluid and in a second heat pump mode at an opposite polarity of its said respective actuating signal to cool said working fluid, and means providing fluid communication between said expansion chamber and said working chamber comprising a passageway connecting said expansion chamber to said working chamber, and an incompressible hydraulic liquid in said working chamber, said expansion chamber and said passageway for transferring pressure variations in said expansion chamber to said working chamber while isolating said working chamber from said working fluid.

2. The control system set forth in claim 1, wherein said environmental condition is temperature, said source means is a heat exchanger and heat transfer fluid circulating therethrough and said regulator means is a valve for controlling flow of heat transfer fluid through said heat exchanger.

3. The control system set forth in claim 2 wherein said source means further comprises means for moving air over said heat exchanger and a damper for controlling air movement and wherein said control system further comprises second actuating means responsive to an actuating signal from control means to operate said damper, said second actuating means also having an expansion chamber with evaporatable-condensable working fluid therein serving as a source of variable pressure, and second thermoelectric means for controlling the temperature of said working fluid in said second actuating means.

4. The control system set forth in claim 1 wherein said thermoelectric means comprises bismuth-telluride semiconductor elements having junctions therebetween and arranged in a module with opposite conductivity types electrically connected in series and thermally in parallel.

5. The control system set forth in claim 1 wherein said expansion chamber has an upper portion, a lower portion and a portion intermediate said upper and lower portions and wherein said hydraulic liquid and said working fluid are selected so that said working fluid is at said lower portion in its liquid state and at said upper portion in its vapor state, said hydraulic liquid being at said intermediate position, and wherein said fluid communication means includes a means forming a passageway opening at one end in said intermediate portion, substantially at a center of said expansion chamber, and said passageway means opens at its other end in said working chamber.

6. The control system set forth in claim 5 wherein said expansion chamber includes a bottom wall and said thermoelectric means comprises a plurality of semiconductor elements having junctions therebetween and arranged in a module with opposite conductivity types electrically connected in series and thermally in parallel to provide a first junction face at one side of said module and a second junction face at an opposite of said module, said first and second faces exhibiting opposite thermal effects, and wherein said module has one of said junctions faces in direct thermal contact with said bottom wall of said expansion chamber.

7. The control system set forth in claim 6 wherein said working chamber has a top wall and wherein said other junction face of said thermoelectric module is in direct thermal contact with a surface of said top wall exterior of said working chamber.

8. The control system set forth in claim 1 wherein said hydraulic fluid is alcohol.

9. An electrical to mechanical transducer of the type adapted to provide a mechanical output displacement which varies as a function of an electrical signal which varies in both amplitude and polarity, comprising means providing a working chamber, piston means movable in said working chamber, output means displaceable by said piston means as a function of fluid pressure at said working face, and means for varying said fluid pressure on said working face as a function of said electrical signal, said fluid pressure varying means comprising means forming an expansion chamber, an evaporatable-condensable working fluid in said chamber, said working fluid being changeable from a liquid phase to a vapor phase and vice versa so that pressure in said expansion chamber varies in accordance with working fluid temperature, a semiconductor thermoelectric means exhibiting a Peltier effect and operable in a first heat pump mode at one polarity of said electrical signal to heat said working fluid and in a second heat pump mode at an opposite polarity of said electrical signal to cool said working fluid to thereby vary pressure in said expansion chamber, and means establishing fluid communication between said expansion chamber and said working chamber comprising a passageway connecting said expansion chamber to said working chamber and an incompressible hydraulic liquid in said working chamber, said expansion chamber and said passageway for transferring pressure variations in said expansion chamber to said working chamber while isolating said working chamber from said working fluid.

10. The transducer set forth in claim 9 wherein said hydraulic fluid is contained in said working chamber, said fluid communication means and at least a predetermined portion of said expansion chamber, said expansion chamber has an upper portion and a lower portion, said predetermined portion being intermediate said upper and lower portions, said hydraulic liquid and said working fluid are selected so that said working fluid is at said lower portion in its liquid state and at said upper portion in its vapor state and wherein said passageway opens at one end in said intermediate portion of said expansion chamber in communication with said hydraulic liquid and said passageway means opens at its other end in said working chamber.

11. The transducer set forth in claim 10 wherein said hydraulic liquid is alcohol and said working fluid is trichloromonofluoromethane.

12. The transducer set forth in claim 9 wherein said expansion chamber includes a bottom wall and said thermoelectric means comprises a plurality of semiconductor elements having junctions therebetween and arranged in a module with opposite conductivity types electrically connected in series and thermally in parallel to provide a first junction face at one side of said module and a second junction face at an opposite of said module, said first and second faces exhibiting opposite thermal effects, and wherein said module has one of said junctions faces in direct thermal contact with said bottom wall of said expansion chamber.

13. The transducer set forth in claim 12 wherein said working chamber has a top wall and wherein said other junction face of said thermoelectric module is in direct thermal contact with a surface of said top wall exterior of said working chamber.

* * * * *